US006043700A

United States Patent [19]

Hoang

[11] Patent Number: 6,043,700

[45] Date of Patent: Mar. 28, 2000

[54] ANALOG MULTIPLIER WITH THERMALLY COMPENSATED GAIN

[75] Inventor: Tuong Hai Hoang, San Jose, Calif.

[73] Assignee: National Semiconductor Corporation, Santa Clara, Calif.

[21] Appl. No.: 08/953,448

[22] Filed: Oct. 17, 1997

[51] Int. Cl.[7] .......... G06F 7/44

[52] U.S. Cl. .......... 327/359; 327/120; 327/357; 327/513

[58] Field of Search .......... 327/119–122, 355–357, 327/359, 362, 513

[56] References Cited

U.S. PATENT DOCUMENTS

| | | | |
|---|---|---|---|
| 4,019,118 | 4/1977 | Harwood | 327/119 |
| 5,319,267 | 6/1994 | Kimura | 327/122 |
| 5,699,080 | 12/1997 | Hatanaka | 327/66 |
| 5,883,539 | 3/1999 | Kimura | 327/65 |

FOREIGN PATENT DOCUMENTS

| | | | |
|---|---|---|---|
| 4-102011 | 4/1992 | Japan | 327/65 |

*Primary Examiner*—Kenneth B. Wells
*Attorney, Agent, or Firm*—Skjerven Morrill MacPherson Franklin & Friel LLP

[57] ABSTRACT

A bipolar analog multiplier with a greatly reduced output sensitivity to temperature. The multiplier uses the difference between the multiplier input voltages and the reference voltages to generate currents. Voltages which are logarithmically dependent on the generated currents are developed and applied to inputs of bipolar variable transconductance stages. Circuits are used to reduce ringing at the output of the multiplier.

13 Claims, 11 Drawing Sheets

ANALOG MULTIPLIER WITH THERMALLY COMPENSATED GAIN

FIELD OF THE INVENTION

The present invention relates to analog multipliers and, more specifically, to pseudo-four-quadrant analog multipliers requiring a reduced thermal sensitivity such as required in the multiplication stage of a preamplifier of a cathode-ray tube.

DESCRIPTION OF THE RELATED ART

In analog-signal processing the need often arises for a circuit that takes two analog input signals and produces an output signal proportional in magnitude to their product. Such a circuit is called an analog multiplier. The term "four-quadrant" multiplier is well known in the art, and refers to a circuit capable of multiplying two signed analog signals. Four-quadrant analog multipliers are fundamental building blocks for many circuit applications, e.g. phase detectors in phase-locked loops and frequency translators. four-quadrant analog multipliers are specially useful in applications such as audio and video signal processing and adaptive filters.

A number of diverse circuit techniques have been developed to generate an output signal that is proportional in magnitude to the product of two input signals. One technique which is also readily suited to monolithic circuits depends upon the variations in transconductance in differential stages to perform the four-quadrant multiplication. When constructed from bipolar transistors, the technique makes use of the dependence of the transistor transconductance on the emitter current bias.

One analog multiplier is the so-called "Gilbert Cell", described in B. Gilbert, "A precise Four-Quadrant Multiplier with Subnanosecond Response", IEEE J. Solid-State Circuits, Vol. SC-3, 373–380 (December 1968). The Gilbert Cell is constructed using bipolar transistors and relies on variations in transconductance of three differential stages to perform the multiplication. The Gilbert Cell however, has a very limited input dynamic range.

FIG. 1 illustrates a transistor schematic representation of an analog multiplier 100 known in the prior art. The circuit employs variable-transconductance technique to generate an output voltage $V_M$ which is the product of the three input voltages, namely $V_x$, $V_y$ and Video. Output voltage $V_M$ is applied to the input terminal of output buffer 101, which has a gain of "−10" and which generates output voltage $V_{out}$ at its output terminal.

The first disadvantage of analog multiplier 100 of FIG. 1 is that it is highly sensitive to temperature variation. From FIG. 1 it can be seen by inspection that $$I_1-I_2=2*(V_x-2)/R_{x2} \quad (1)$$

$$I_3-I_4=2*(V_y-2)/R_{y2} \quad (2)$$

$$V_1=(I_1-I_2)*R_{x1}=2*(R_{x1}/R_{x2})*(V_x-2) \quad (3)$$

$$V_2=(I_3-I_4)*R_{y1}=2*(R_{y1}/R_{y2})*(V_y-2) \quad (4)$$

The collector currents $I_{qc1}$, $I_{qc2}$, $I_{qd1}$ and $I_{qd2}$ are related to voltages $V_1$ and $V_2$ according to the following equations:

$$V_1=V_T*\ln(I_{qd1}/I_{qd2}) \quad (5)$$

$$V_2=V_T*\ln(I_{qc1}/I_{qc2}) \quad (6)$$

$V_T$ is the thermal voltage and is equal to kT/q which is approximately equal to 26 mv at 300° K, where k =Boltzmann's constant T =Temperature (in °K)

q =electric charge of an electron

The multiplier output voltage $V_M$ is directly proportional to the terms $\ln(I_{qd1}/I_{qd2})$ and $\ln(I_{qc1}/I_{qc2})$. Consequently, variations in these two ratios directly affect the value of the multiplier output voltage. To keep these ratios constant over temperature, voltages $V_1$ and $V_2$ must follow the temperature variations of $V_T$. Since the resistance of resistors $R_{x1}$ and $R_{x2}$ have a similar temperature dependence, the ratio $R_{x1}/R_{x2}$ and consequently, output voltage $V_1$ have a minimal temperature sensitivity as can be seen from equation (3). Similarly, voltage $V_2$ has a negligible temperature dependence. Therefore, changes in temperature directly affect multiplier output voltage $V_M$ through the thermal voltage term $V_T$.

FIG. 2 illustrates a simulation result of the variation in output voltage $V_M$ of multiplier 100 of FIG. 1 as the input voltages $V_x$ and $V_y$ are varied. For this simulation, input voltages $V_x$ and $V_y$ are set equal to one another and are swept from 0 volt to 4 volts as shown along the x-axis, and input voltage Video is kept constant at 0.7 volts. The y-axis shows the difference in the output voltage $V_M$ as the input voltages $V_x$ and $V_y$ are varied. For proper operation, it is required that output voltage $V_M$ of multiplier 100 rise with increasing temperature when input voltages $V_x$ and $V_y$ are above 2 volts. Similarly, it is required that output voltage $V_M$ of multiplier 100 fall with decreasing temperature when input voltages $V_x$ and $V_y$ are below 2 volts.

FIG. 3 shows the change in output voltage $V_{out}$ of FIG. 1 when temperature changes from 0° C. to 85° C., for the condition when input voltages $V_x$ and $V_y$ are both equal to 3 volts and input voltage Video is at 0.7 volts. From FIG. 3 it can be seen that output voltage $V_{out}$ increases by 620 mv as temperature changes from 0° C. to 85° C. rendering this multiplier ineffective for many applications.

The second disadvantage of multiplier 100 of FIG. 2 is that it has a relatively small input dynamic range above which the multiplier would not behave in a linear fashion.

FIG. 4 illustrates another analog multiplier circuit 200 known in the prior art. Output voltage $V_M$ of multiplier 200 is applied to the input terminal of output buffer 201 which has a gain of "−10" and which generates output voltage $V_{out}$ at its output terminal. In analog multiplier circuit 200, diode-connected transistor $Q_a$ is placed between transistor $Q_{aa}$ and the supply voltage $V_{cm1}$, and diode-connected transistor $Q_b$ is placed between transistor $Q_{bb}$ and the supply voltage $V_{CM1}$. By inspection, it can be seen that $$V_1=V_T*ln(I_a/I_b) \quad (7)$$

$$I_a-I_b=2*(V_x-2)/R_{x2} \quad (8)$$

Resistor $R_{x2}$ has a positive temperature coefficient. Therefore, as temperature increases the resistance of the resistor $R_{x2}$ increases, thus causing a reduction in the current term $(I_a-I_b)$ and in the $\ln(I_a/I_b)$ term of equation (8) above. The reduction in the term $\ln(I_a/I_b)$ decreases voltage $V_1$'s dependence on voltage $V_T$, which is undesirable.

FIG. 5 shows an increase of 365 mv in the output voltage $V_{out}$ of FIG. 4 when input voltages $V_x$ and $V_y$ are each set to 3 volts, input voltage Video is at 0.7 volts, and temperature is changed from 0° C. to 85° C. Although circuit 200 of FIG. 4 provides an improvement over circuit 100 of FIG. 1, the multiplier output voltage shift for the given temperature range is too great, thereby rendering use of this multiplier inadequate for many applications.

The second disadvantage of the multiplier of FIG. 4 is that it suffers from ringing problems at its output terminal. The emitter terminals of transistors $Q_a$ and $Q_b$ each have a high impedance when the input voltage $V_x$ or $V_y$ is either at 0 or 4 volts, making the output signal of the multiplier susceptible to ringing effect.

SUMMARY

An analog multiplier for multiplying three voltage signals utilizes circuitry for keeping the multiplier output voltage reasonably constant over temperature. Two semi-logarithmic voltage generating stages are used to provide input voltages to two variable transconductance circuits forming the last stage of the multiplier. Two differential stages receive level-shifted multiplier input voltages and convert them to currents. The multiplier includes devices for eliminating ringing at the output of the multiplier.

In accordance with the present invention the analog multiplier has a reduced temperature dependence. The multiplier has a wide dynamic range and is immune to ringing effect.

DETAILED DESCRIPTION

Figure 1:
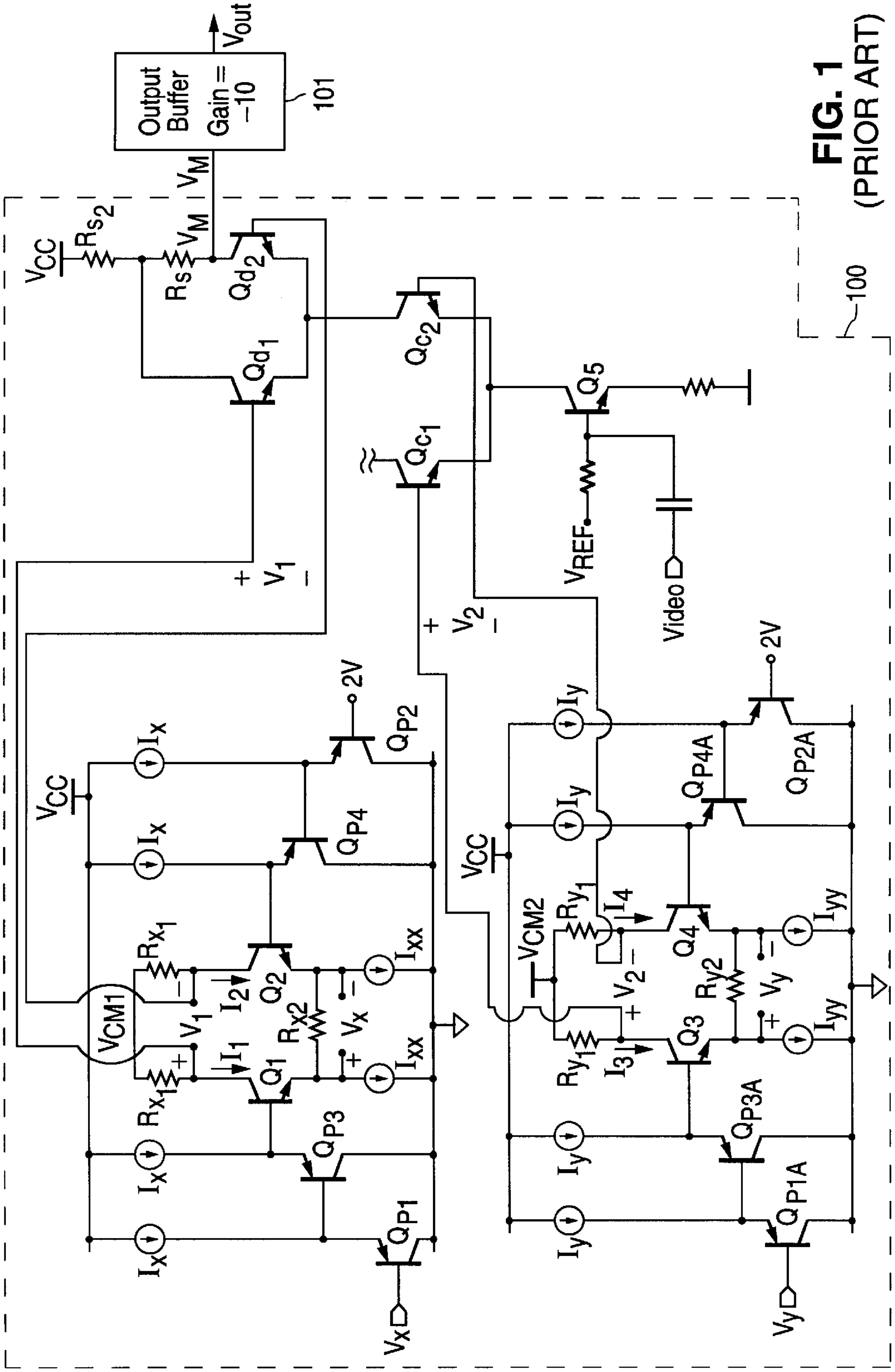
FIG. 1 (PRIOR ART)
FIG. 1 illustrates an analog multiplier as known in the prior art.
Figure 2:
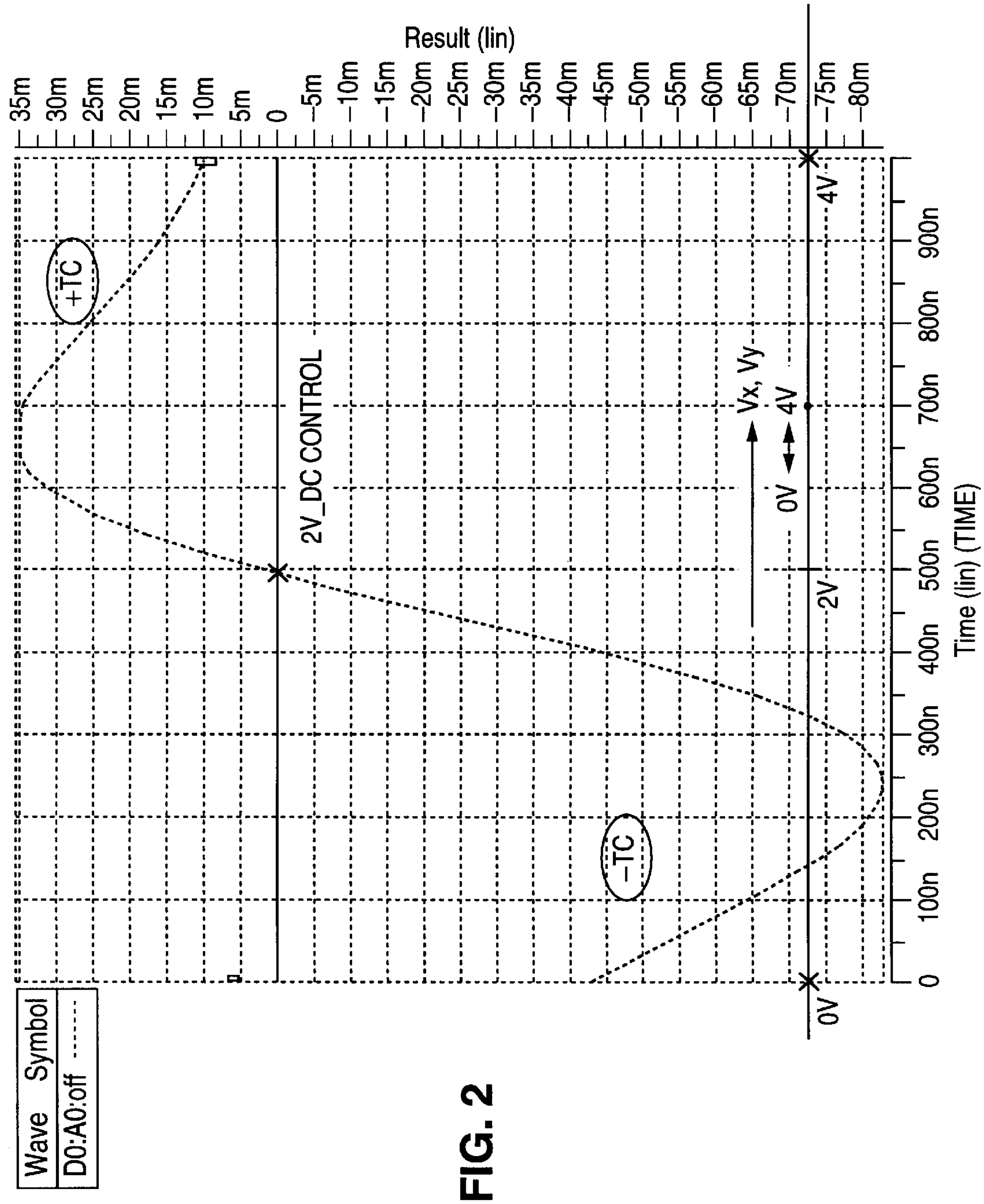
FIG. 2 illustrates the required temperature characteristic of the output voltage $V_M$ of the multiplier of FIG. 1 when input voltages $V_x$ and $V_y$ are set equal to one another and are varied from 0 volts to 4 volts and input voltage Video is kept constant at 0.7 volts.
Figure 3:
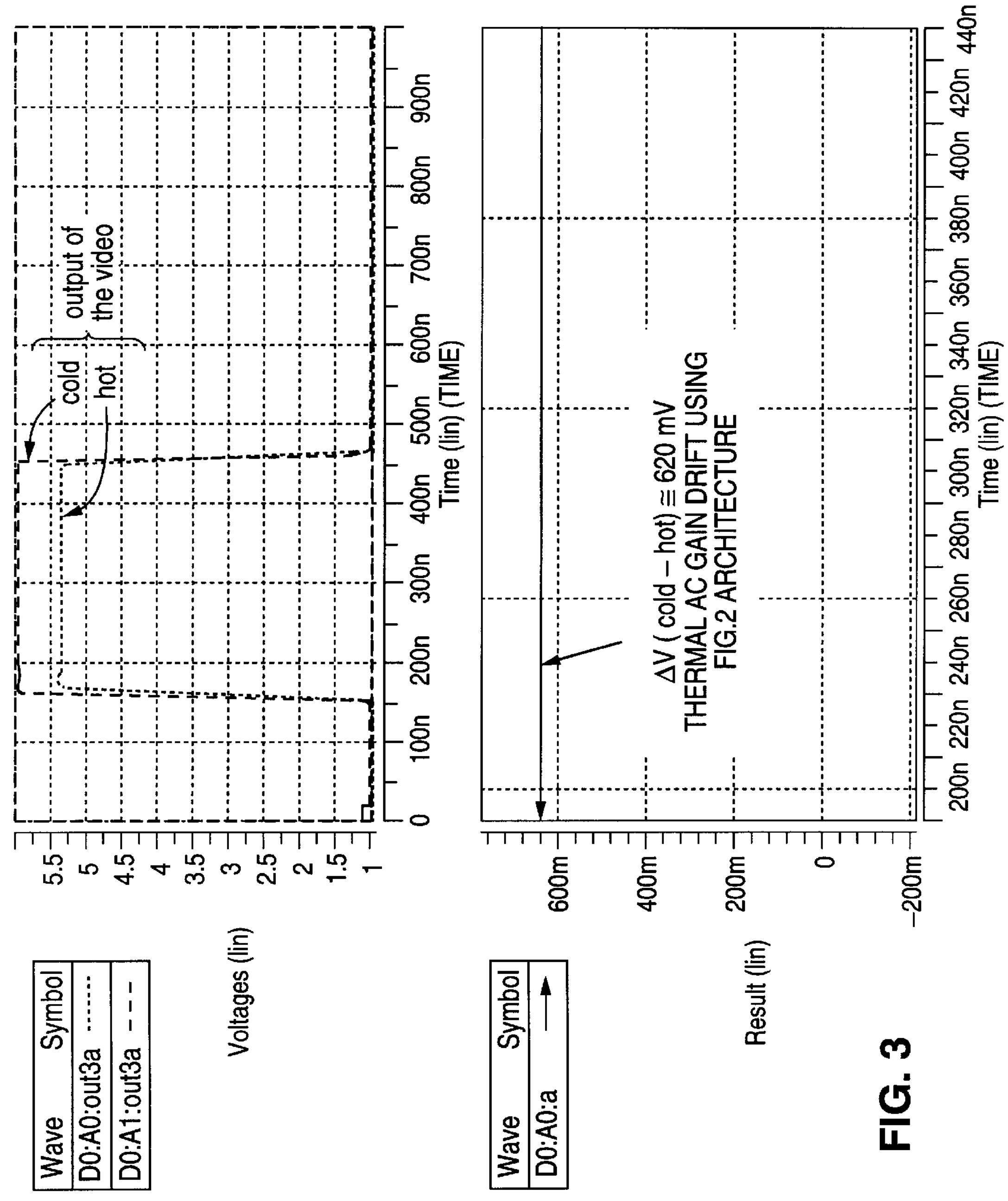
FIG. 3 illustrates the voltage $V_{out}$ at the output terminal of the output buffer of FIG. 1 when a voltage pulse of 0.7 volts is applied to the Video input terminal of the multiplier at two different temperatures, namely 0° C. and 85° C. Input voltages $V_x$ and $V_y$ are set to 3 volts in both cases.
Figure 4:
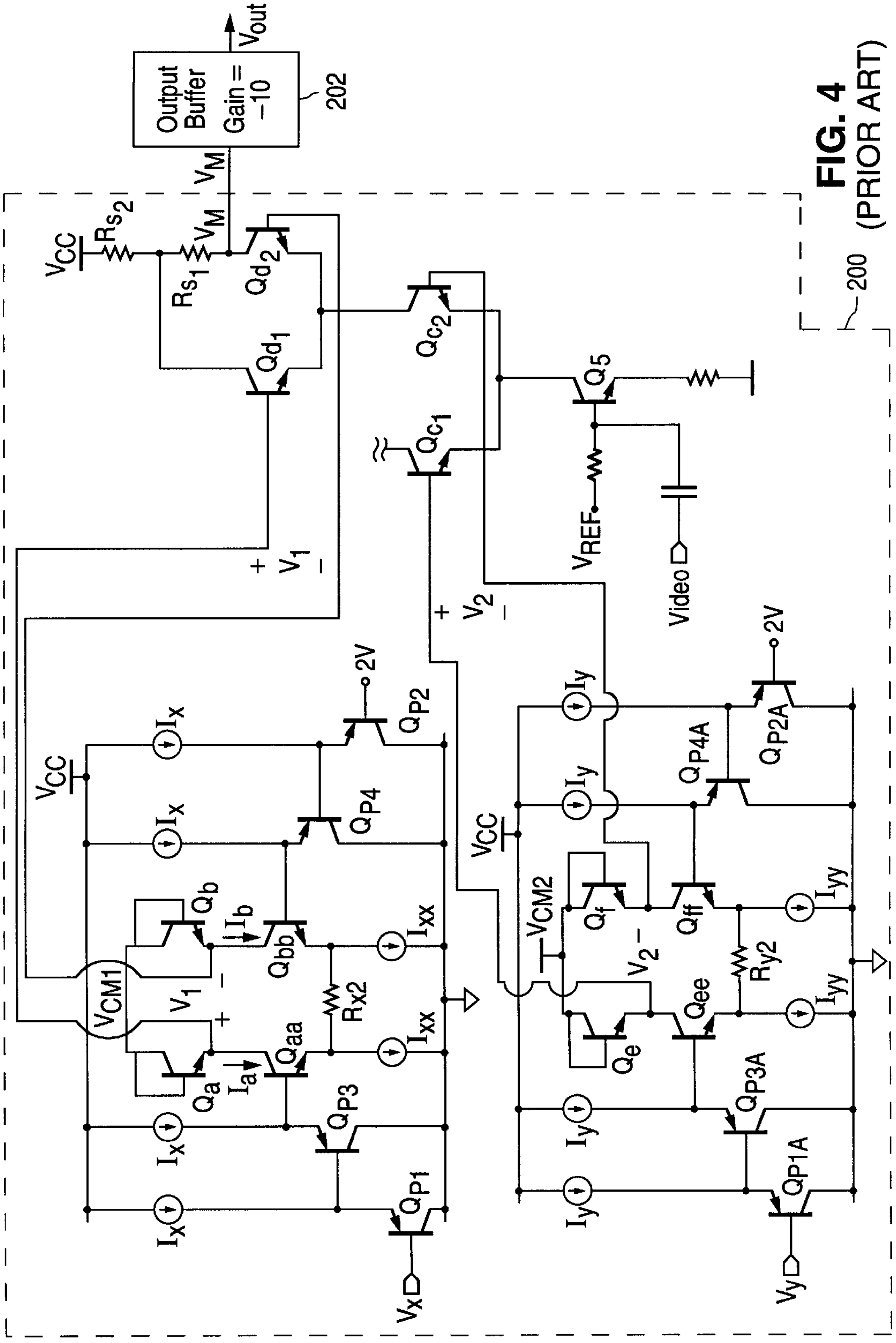
FIG. 4 (PRIOR ART)
FIG. 4 illustrates an analog multiplier as known in the prior art.
Figure 5:
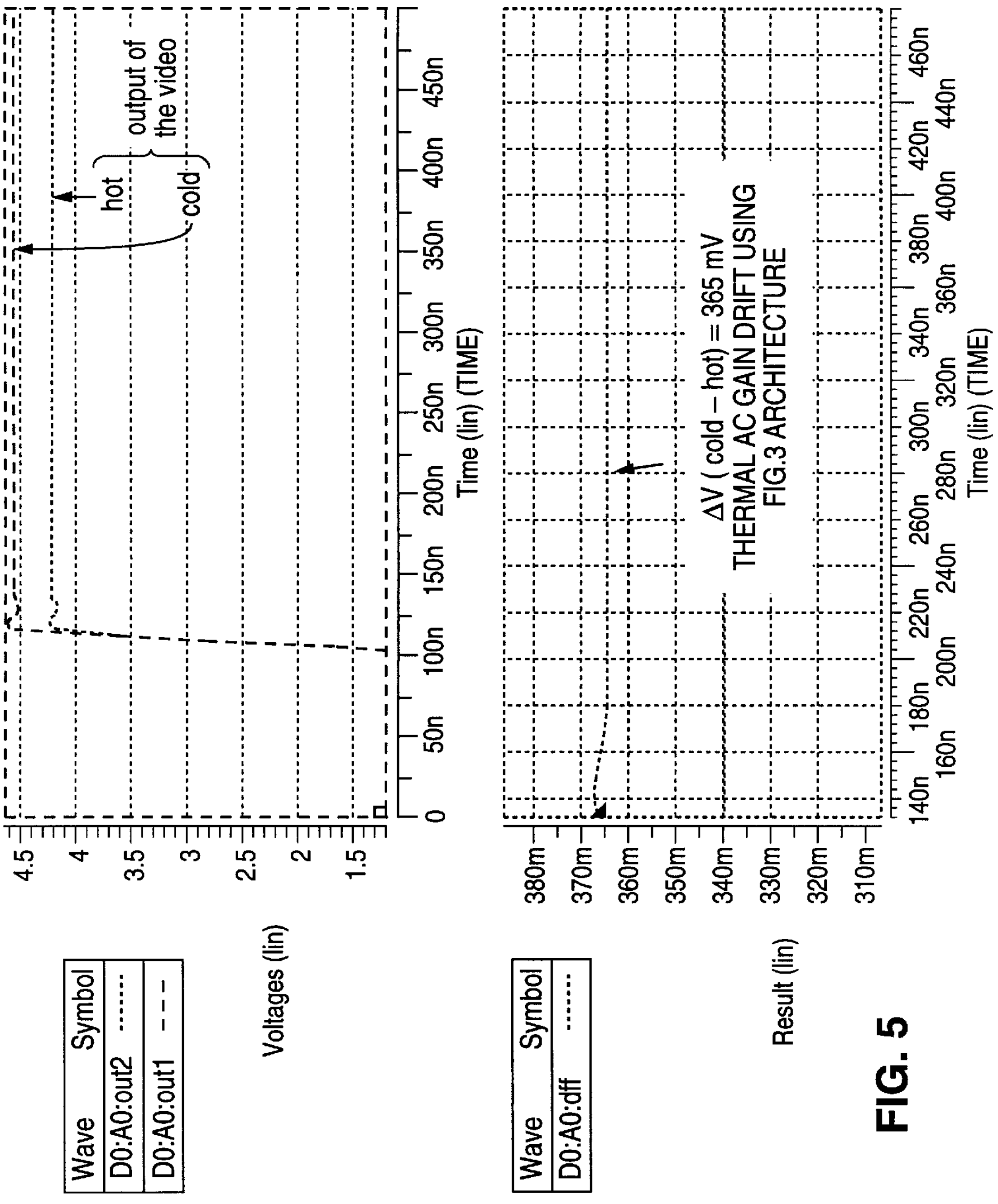
FIG. 5 illustrates the voltage $V_{out}$ at the output terminal of the output buffer of FIG. 4 when a voltage pulse of 0.7 volts is applied to the Video input terminal of the multiplier at two different temperatures, namely 0° C. and 85° C. Input voltages $V_x$ and $V_y$ are set to 3 volts in both cases.
Figure 6:
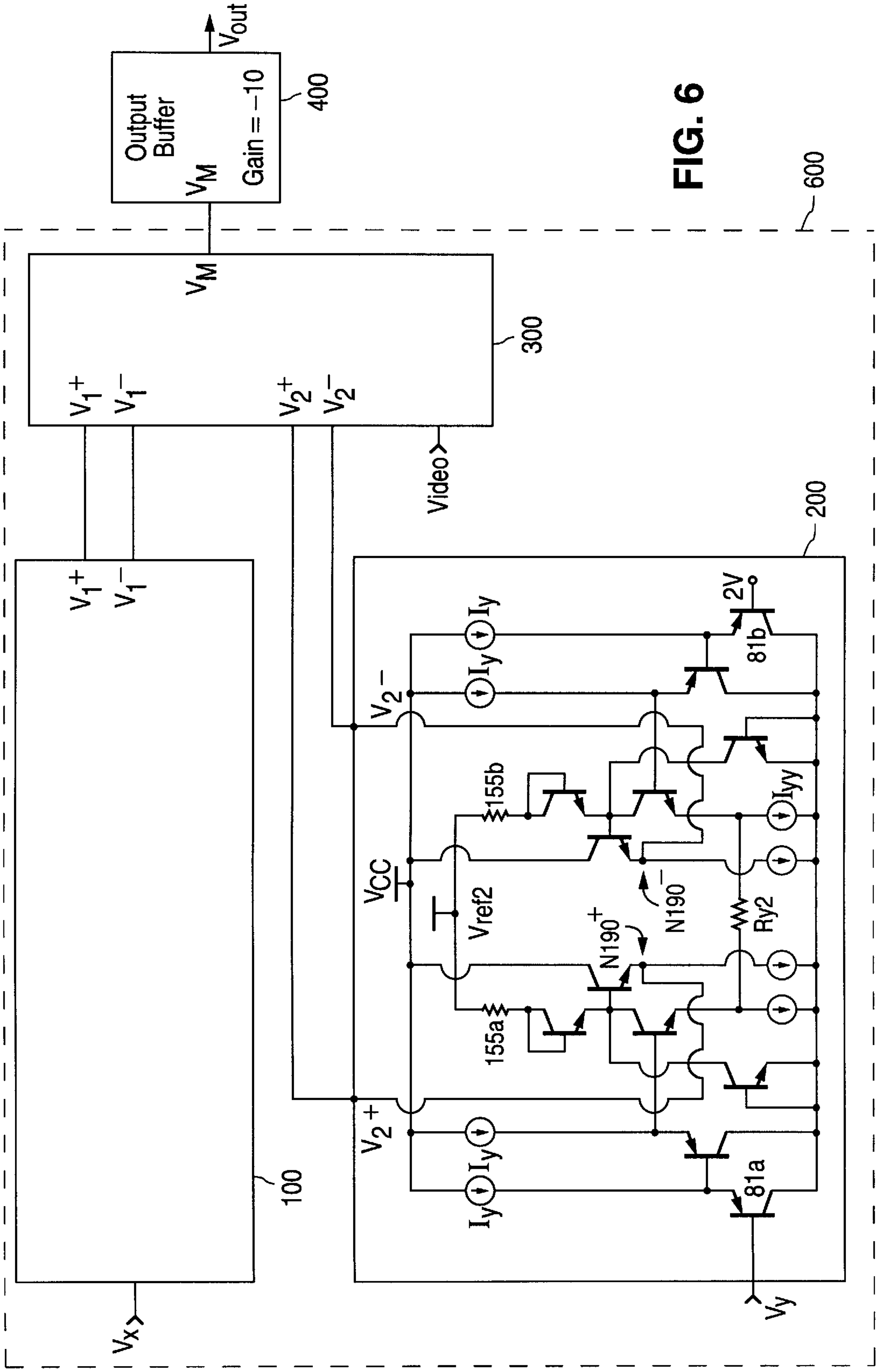
FIG. 6 illustrates an analog multiplier in accordance with the present invention.

An analog multiplier 600 which provides a thermally compensated output voltage in accordance with the present invention is illustrated in FIG. 6.

As shown in FIG. 6, multiplication of the three voltage inputs $V_x$, $V_y$ and Video is performed in three stages 100, 200 and 300. Stage 100 receives input voltage $V_x$ and generates output voltages $V_1^+$ and $V_1^-$ which are applied to stage 300. Similarly, stage 200 receives input voltage $V_y$ and generates output voltages $V_2^+$ and $V_2^-$ which are applied to stage 300. Stage 300 receives output voltages $V_1^+$ and $V_1^-$ of stage 100, and output voltages $V_2^+$, $V_2^-$ of stage 200 as well as input voltage Video and generates multiplier output voltage $V_M$ . The supply voltages $V_{ref1}$ and $V_{ref2}$ of stages 100 and 200 are 7.0 volts and 8.0 volts respectively. Output buffer 400, which has a gain of "−10", receives multiplier output voltage $V_M$ at its input terminal and generates output voltage $V_{out}$ at its output terminal.

Except for the differences noted above, stages 100 and 200 are identical to one another in construction and in function, therefore the description of the operation of stage 100 equally applies to that of stage 200 and as such only the operation of stage 100 is discussed.

Figure 8:
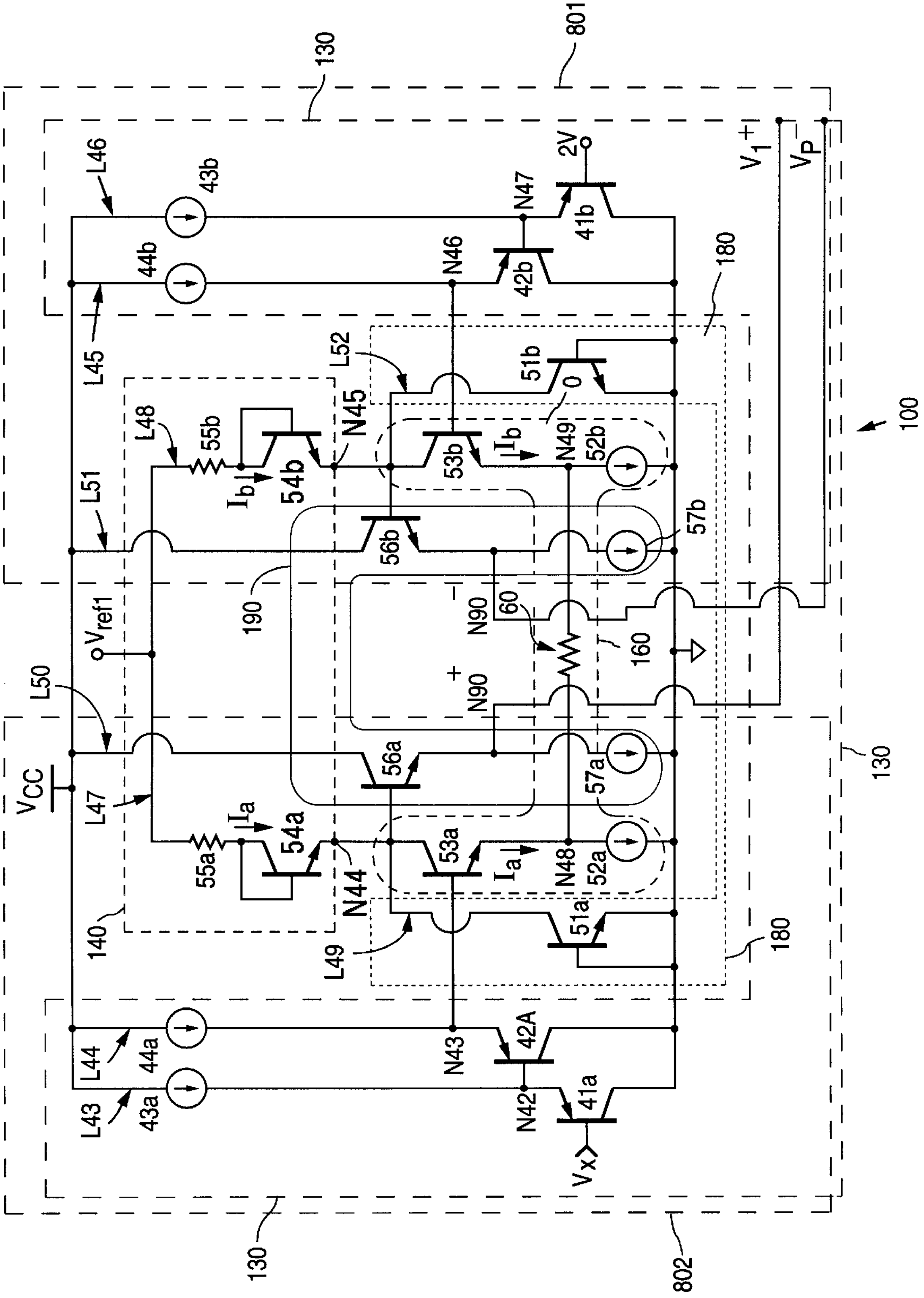
FIG. 8 illustrates stage 100 of the multiplier in accordance with the present invention.

An implementation of stage 100 is shown in FIG. 8. A Contrast-Control circuitry, not shown in the drawings (known in the Art), generates the first multiplier input voltage $V_x$ which is applied to the base terminal of transistor 41*a* of stage 100. A constant 2 volts supply applied to the base terminal of transistor 41*b* provides the second input voltage to stage 100. Stage 100 includes four fully balanced sections 130, 160, 180 and 190. To enable a pseudo-four-quadrant multiplication, stage 100 includes a reference circuit 801 receiving a constant 2 volts supply at the base terminal of transistor 41*b* . This reference circuit is matched by a variable input circuit 802 for receiving input voltage $V_x$ at the base terminal of transistor 41*a*. Variable input circuit 802 includes partitions L43, L44, L49, L47 and L50 and reference circuit 801 includes partitions L45, L46, L48, L51 and L52. Due to the substantially identical structure of reference circuit 801 and variable circuit 802, for values of input voltage $V_x$ greater than 2 volts, output voltage $V_1$ across nodes $V_1^+$ and $V_1^-$ is positive and for values of input voltage $V_x$ less than 2 volts, output voltage $V_1$ is negative. Thus, when input voltage $V_x$ is exactly equal to 2 volts, the output voltage $V_1$ is zero.

Section 130 of stage 100 includes four DC voltage level-shifter partitions, namely L43, L44, L45 and L46. Each one of these partitions includes a current source and a bipolar transistor. For example, partition L43 includes current source 43*a* and transistor 41*a*. The current source in each partition is used to properly bias the bipolar transistor connected to that partition. Thus, the DC voltage level-shifters in partitions L43 and L44 raise the voltage at the base terminal of transistor 53*a* above that of signal $V_x$ by two base-emitter ($V_{be}$) voltages (e.g. between 1.0 to 1.2 volts). Similarly the voltage at the base terminal of transistor 53*b* is two $V_{be}$ voltages higher than 2 volts. Voltage level-shifting is needed to prevent transistor 53*a* from turning off when multiplication by zero is desired.

Section 140 of stage 100 generates a voltage between nodes N44 and N45 at the emitter terminals of transistors 54*a* and 54*b* that is semi-logarithmically dependent on the ratio of the currents $I_a$ and $I_b$ which flow through transistors 54*a* and 54*b*. Section 140 includes partitions L47 and L48. Partition L47 contains diode-connected transistor 54*a* and resistor 55*a*. Partition L48 includes diode-connected transistor 54*b* and resistor 55*b*. One terminal of resistor 55*a* is connected to the supply voltage $V_{ref1}$, the other terminal of resistor 55*a* is connected to the collector terminal of transistor 54*a*. The base and the collector terminals of transistor 54*a* are connected together. The emitter terminal of transistor 54*a* is connected to node N44. Similarly, in partition L48, the terminals of resistor 55*b*are connected to the supply voltage $V_{ref1}$ and the collector terminal of transistor 54$b$. The base and the collector terminals of transistor 54$b$ are connected together. The emitter terminal of transistor 54$b$ is connected to node N45. Currents $I_a$ and $I_b$ flow through partitions L47 and L48 respectively.

Section 160 of stage 100 is a differential voltage to current converter. Section 160 converts the level-shifted voltages at the base terminals of transistors 53$a$ and 53$b$ to currents $I_a$ and $I_b$, respectively flowing in partitions L47 and L48 of section 140 of stage 100 and through transistors 53$a$ and 53$b$ of section 160 of stage 100. The base, the emitter and the collector terminals of transistor 53$a$ are connected to nodes N43, N44 and N48 respectively. The base, the emitter and the collector terminals of transistor 53$b$ are connected to nodes N46, N49 and N45 respectively. The terminals of resistor 60 are connected to nodes N48 and N49. The terminals of current source 52$a$ are connected to nodes N48 and ground. The terminals of current source 52$b$ are connected to nodes N49 and ground.

Figure 10:
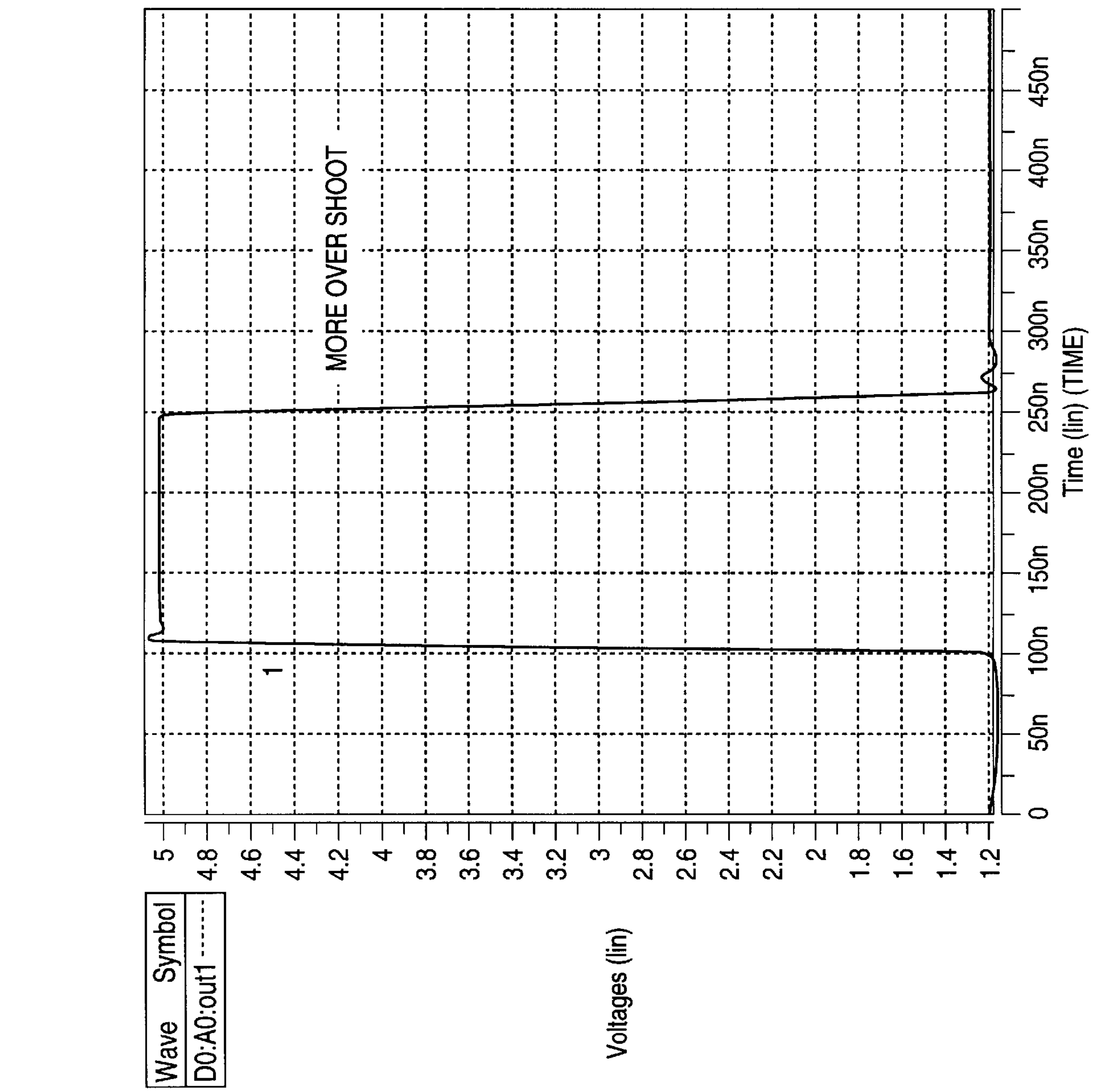
FIG. 10 illustrates the effect of ringing at the output terminal of the output buffer of FIG. 6 when no impedance lowering devices are used.
Figure 11:
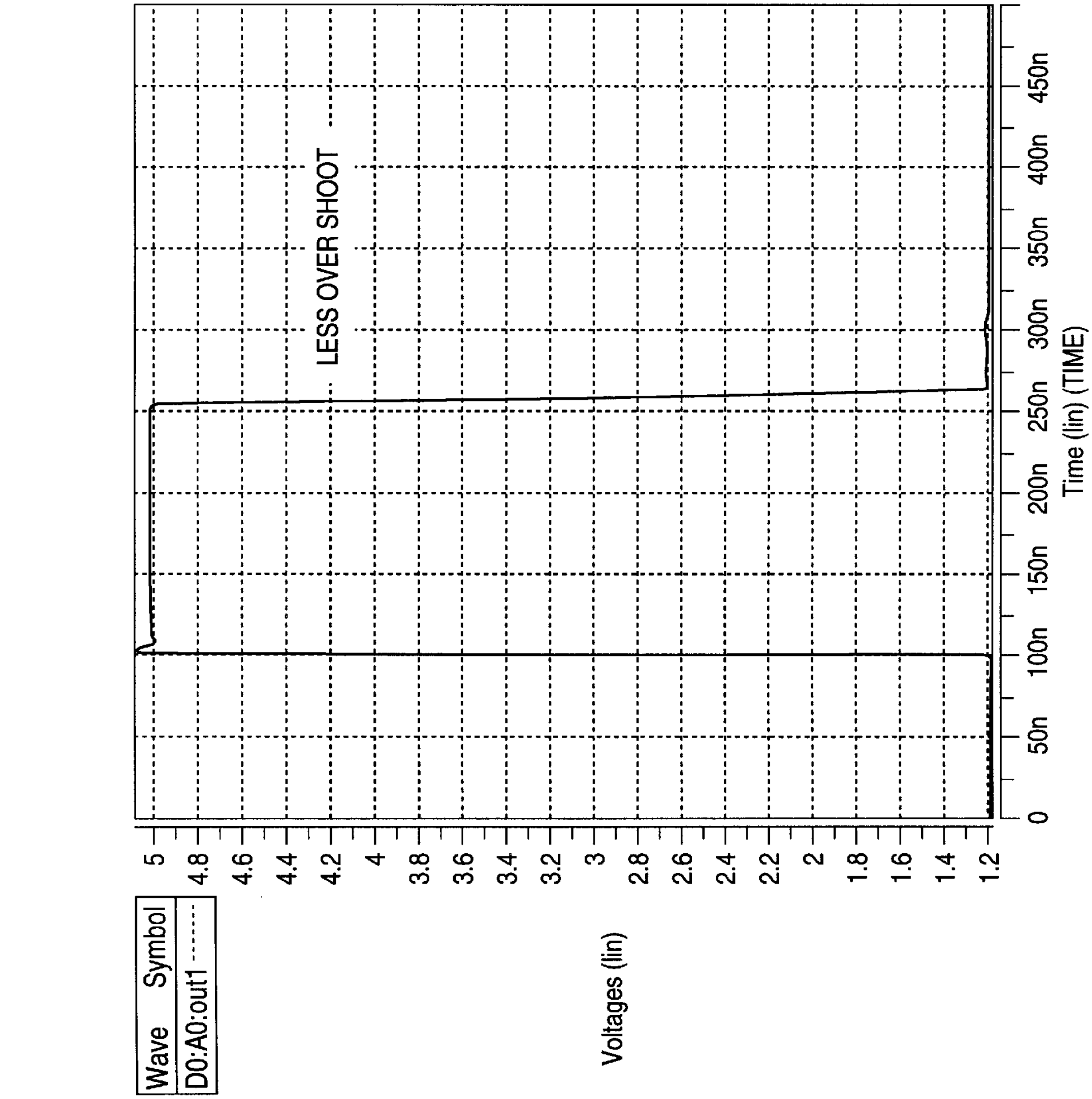
FIG. 11 illustrates the diminished ringing at the output terminal of the output buffer of FIG. 6 when impedance lowering devices are used in the multiplier in accordance with the present invention.

Section 180 of stage 100 which includes transistors 51$a$ and 51$b$, reduces the impedance of nodes N44 and N45 in order to inhibit ringing at the multiplier output, which may occur at frequencies near 100 MHz and above, when either input voltage $V_x$ or input voltage $V_y$ is either at zero or four volts. The base and the emitter terminals of both transistors 51$a$ and 51$b$ are connected to ground. The collector terminals of transistors 51$a$ and 51$b$ are connected to nodes N44 and N45 respectively. The reduction in impedance of nodes N44 and N45 is achieved by the collector-base capacitance and the collector-substrate capacitance of transistors 51$a$ and 51$b$ respectively. FIGS. 10 and 11 illustrate the output voltage $V_{out}$ of output buffer 400 without and with the impedance lowering devices 51$a$ and 51$b$ respectively. As shown in FIG. 11, the output voltage $V_{out}$ has a lower ringing when section 180 is included in analog multiplier 600.

Section 190 of stage 100 includes two emitter-follower amplifiers whose output terminals are connected to the input terminals of the variable-transconductance section 320 of stage 300. Section 190 includes transistors 56$a$ and 56$b$ and current sources 57$a$ and 57$b$. The collector terminals of transistors 56$a$ and 56$b$ are both connected to $V_{cc}$ voltage supply. The emitter and the base terminals of transistor 56$a$ are connected to nodes N90$^+$ and N44 respectively. The emitter and the base terminals of transistor 56$b$ are connected to nodes N90$^-$ and N45 respectively. Current sources 57$a$ and 57$b$ are connected between nodes N90$^+$ and ground and nodes N90$^-$ and ground respectively. The near-unity gain of the emitter-follower amplifiers allows the semi-logarithmic voltage across nodes N44 and N45 to also appear across nodes N90$^+$ and N90$^-$. The emitter-follower amplifier stages serve as drive-boosters giving the emitter terminals of transistors 56$a$ and 56$b$ the needed capability to drive the differential input terminals $V_1^+$ and $V_1^-$ of the variable-transconductance section 320 of stage 300.

Figure 9:
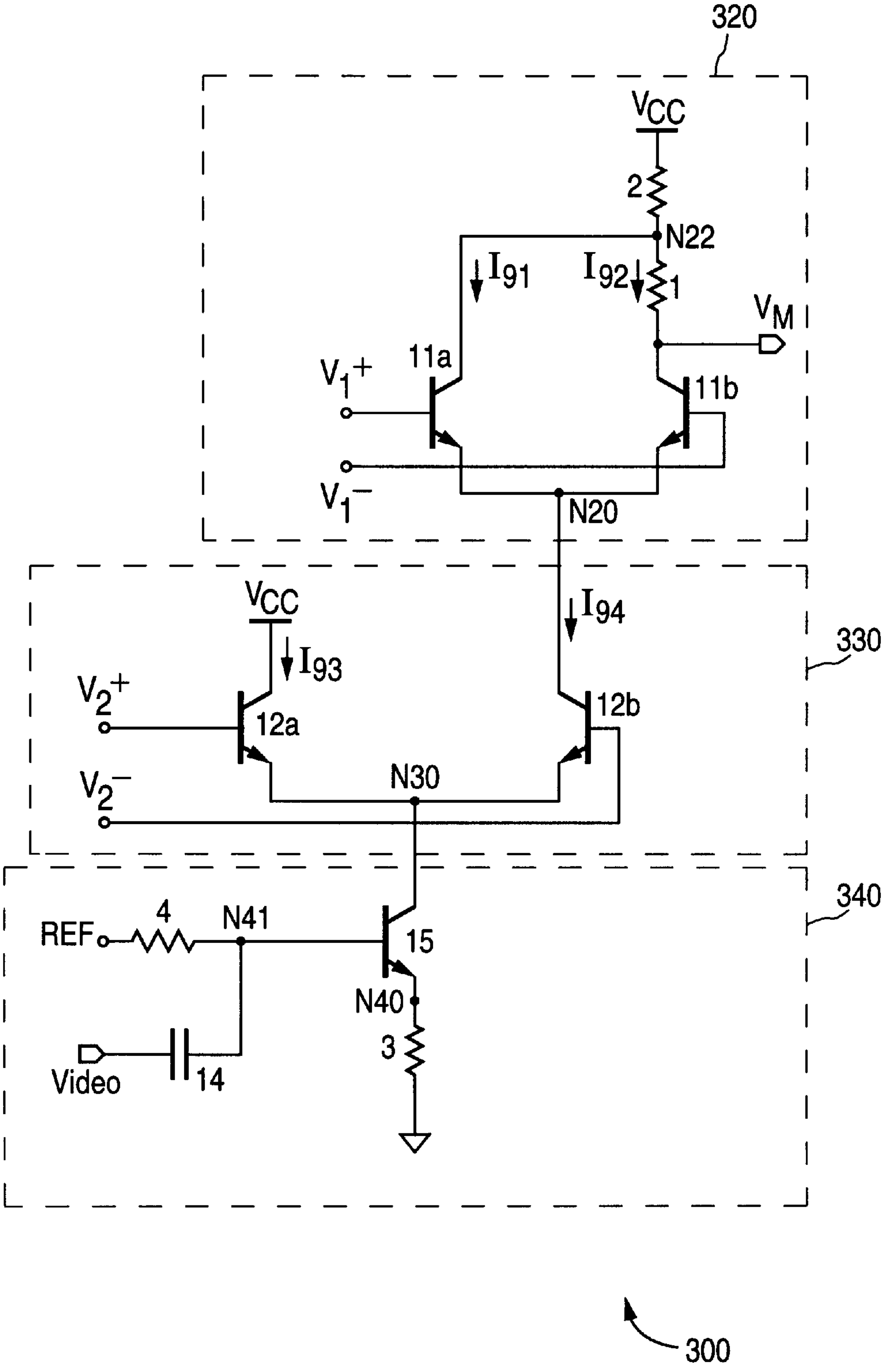
FIG. 9 illustrates stage 300 of the multiplier in accordance with the present invention.

FIG. 9 shows stage 300 which provides the final phase of the multiplication and which includes sections 320, 330 and 340. Section 320 is a variable-transconductance stage formed by resistors 1 and 2 and an emitter-coupled differential pair consisting of transistors 11$a$ and 11$b$. The semi-logarithmic voltage across emitter terminals of transistor 56$a$ and 56$b$ of section 180 of stage 100 is applied to the base terminals of transistors 11$a$ and 11$b$. The emitter terminals of transistors 11$a$ and 11$b$ are connected to node N20. The collector terminal of transistor 11$b$ provides the multiplier output voltage $V_M$. The collector of transistor 11$a$ is connected to node N22. The terminals of resistor 1 are connected across nodes $V_M$ and N22 and the terminals of resistor 2 are connected across nodes $V_{cc}$ and N22.

Section 330 is also a variable-transconductance stage formed by a differential pair consisting of transistors 12$a$ and 12$b$. The semi-logarithmic voltage across terminal N190$^+$ and N190$^-$ of stage 200 (shown in FIG. 6) is applied to the base terminals of transistors 12$a$ and 12$b$. The emitter terminals of transistors 12$a$ and 12$b$ are connected to node N30. The collector terminal of transistor 12$a$ is connected to $V_{cc}$ and the collector terminal of transistor 12$b$ is connected to node N20 of section 320.

Section 340 is the variable current-sum stage and includes transistor 15, resistors 3, 4 and capacitor 14. The collector, the base and the emitter terminals of transistor 15 are connected to nodes N30, N41 and N40 respectively. The terminals of resistor 3 are connected across nodes N40 and ground and the terminals of resistor 4 are connected across nodes N41 and the input voltage terminal $V_{ref}$ which is held constant at 2.2 volts. The terminals of capacitor 14 are connected across nodes N41 and input terminal Video which provides the third input voltage terminal to the multiplier 600. Section 340 sets the total current that flows through transconductance stages 320 and 330. A voltage pulse at input terminal Video, is capacitively coupled through capacitor 14 to the base terminal of transistor 15 causing an increase in the base-emitter voltage of transistor 15 and a proportional increase in the total current flow in stage 300, which in turn increases the multiplier output voltage $V_M$. Resistor 4 is used to increase the impedance seen by node $V_{ref}$.

As mentioned before, the output voltage $V_M$ of multiplier 600 of the present invention is dependent on the ratio of the currents $I_{q1}/I_{q2}$ and $I_{q3}/I_{q4}$ flowing through the differential pairs of sections 320 and 330 of stage 300. These ratios are related to voltages $V_1$ and $V_2$ according to the following equations:

$$V_1=V_T*\ln(I_{q1}/I_{q2})$$

$$V_2=V_T*\ln(I_{q3}/I_{q4})$$

where $$V_1=V_1^+-V_1^-$$

and $$V_2=V_2^+-V_2^-$$

To keep the $\ln(I_{q1}/I_{q2})$ term and the $\ln(I_{q3}/I_{q4})$ term constant over a wide range of temperature, voltages $V_1$ and $V_2$ each have a temperature dependence which is similar to that of thermal voltage $V_T$. Let the resistance of each of resistors 55$a$ and 55$b$ of stage 100 be $R_{x1}$ ohms, and the resistance of each of resistors 155$a$ and 155$b$of stage 200 be $R_{yl}$ ohms, voltages $V_1$ and $V_2$ are related to the applied input voltages $V_x$ and $V_x$ according to the following equations $$V_1=V_T*\ln(I_a/I_b)+2*(R_{x1}/R_{x2})*(V_x-2) \quad (9)$$

$$I_a-I_b=2*(V_x-2)/R_{x2}(10)$$

$$V_2=V_T*\ln(I_c/I_d)+2*(R_{y1}/R_{y2})*(V_y-2) \quad (11)$$

$$I_c-I_d=2*(V_y-2)/R_{y2} \quad (12)$$

Based on equations (9), (10), (11) and (12) it can be shown that $$V_1=V_T*\ln(I_a/I_b)+2*(I_a-I_b)*R_{x1} \quad (13)$$

$$V_2=V_T*\ln(I_c/I_d)+2*(I_c-I_d)*R_{y1} \quad (14)$$

Equations (13) and (14) indicate the manner in which multiplier 600 of the present invention achieves an output voltage that remains relatively stable with varying temperature. According to equation (13), voltage $V_1$ is dependent on two terms $(I_a-I_b)$ and $\ln(I_a/I_b)$, as temperature increases, the terms $(I_a-I_b)$ and $\ln(I_a/I_b)$ decreases. The reduction in the $\ln(I_a/I_b)$ term compensates for the increase in voltage $V_T$. However, as temperature increases, $R_{x1}$ resistance also increases, more than offsetting the reduction in temperature dependence of voltage $V_1$ on voltage $V_T$ (due to a reduction in the $\ln(I_a/I_b)$ term), thus giving rise to a voltage $V_1$ which tracks temperature changes in voltage $V_T$ more closely. Similarly, voltage $V_2$ has a temperature dependence that also closely tracks the temperature dependence of voltage $V_T$.

Figure 7:
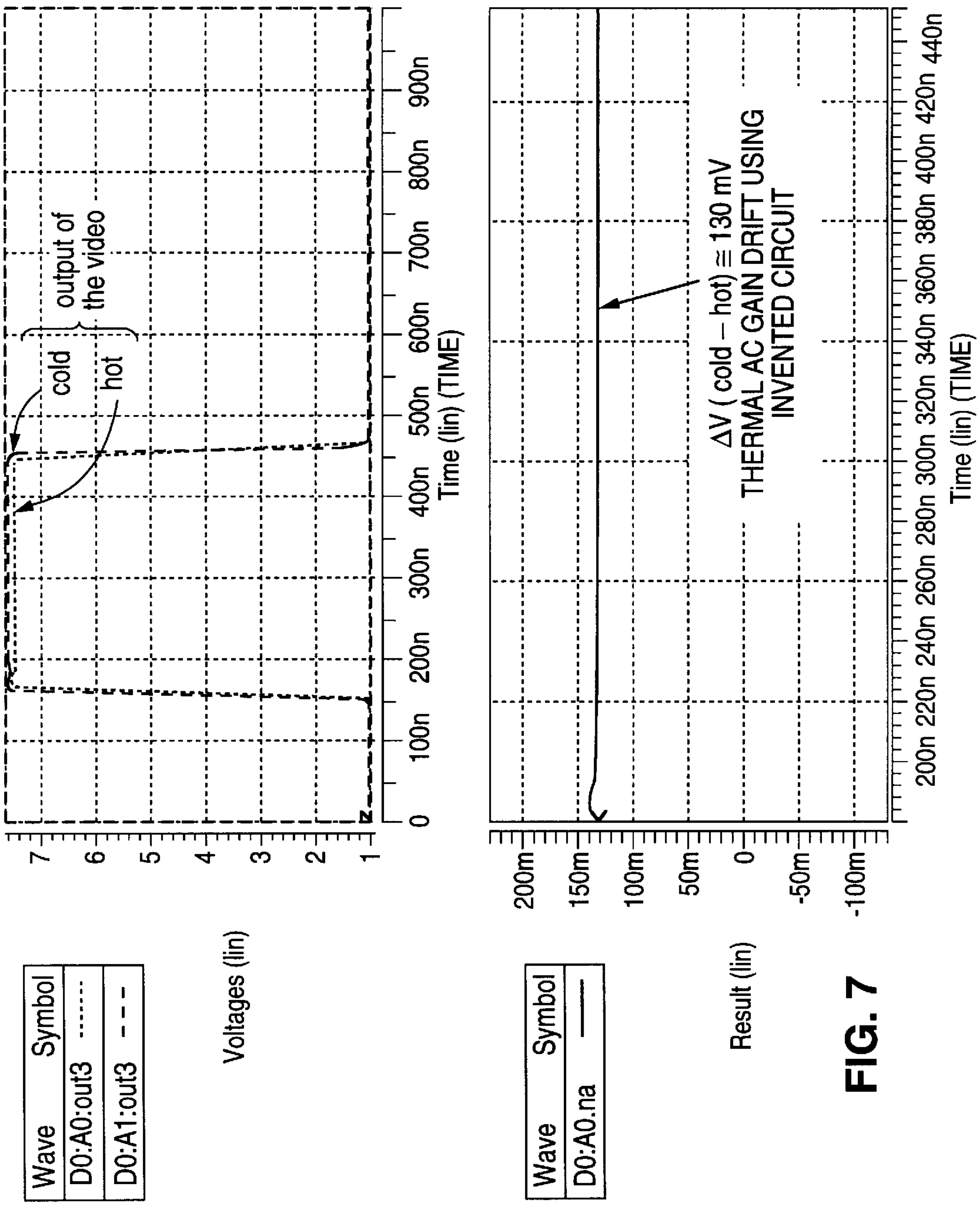
FIG. 7 illustrates the temperature drift of the voltage $V_{out}$ at the output terminal of the output buffer which receives at its input terminal the output voltage of the multiplier in accordance with the present invention.

FIG. 7 shows an increase of 130 mv in the output voltage $V_{out}$ of FIG. 6 when input voltages $V_x$ and $V_y$ are each set to 3 volts, input voltage Video is at 0.7 volts and temperature is changed from 0° C. to 85° C. This increase in voltage is substantially smaller than the corresponding increase in the output voltage of the multipliers of the prior arts over the same temperature change.

One embodiment of the present invention uses square-emitters to match transistors. All resistors in that embodiment namely, resistors 55*a*, 55*b*, 155*a*, 155*b*, 1, 2, 3, 4 are made from p-base implant and have values of 50 ohms, 4 Kohms, 50 ohms, 4 Kohms, 1.5 Kohms, 500 ohms, 2 Kohms and 20 Kohms respectively.

I claim:

1. A pseudo-four-quadrant analog multiplier circuit for receiving a first input voltage, a second input voltage and a third input voltage, and for generating an output voltage, said multiplier comprising:

first and second voltage to current converters each including a resistive element and each receiving a level-shifted voltage of one of said multiplier input voltages and a level-shifted voltage of a reference voltage and in response thereto generating first and second currents substantially proportional to said respective level-shifted multiplier input voltage and said level-shifted reference voltage respectively;

a first voltage generator for receiving said first and second currents of said first voltage to current converter and in response thereto generating a first and a second voltage, said first voltage generator comprising a first and a second diode-connected bipolar transistor, each diode-connected bipolar transistor being connected in series with a resistive element having a positive temperature coefficient, wherein each said transistor of said first voltage generator receives a different one of said first and said second currents of said first voltage to current converter;

a second voltage generator for receiving said first and second currents of said second voltage to current converter and in response thereto generating a first and a second voltage, said second voltage generator comprising a first and a second diode-connected bipolar transistor, each diode-connected bipolar transistor being connected in series with a resistive element having a positive temperature coefficient, wherein each said transistor of said second voltage generator receives a different one of said first and said second currents of said second voltage to current converter;

an output stage for receiving the third multiplier input voltage and the respective first and second voltages generated in each of said first and second voltage generators and in response thereto generating said output voltage.

2. A pseudo-four-quadrant analog multiplier according to claim 1 wherein each voltage to current converter comprises a first bipolar transistor for receiving the level-shifted voltage of one of said multiplier input voltages at its base terminal and a second bipolar transistor for receiving the level-shifted voltage of the reference input voltage at its base terminal, wherein the emitter terminals of the first and the second bipolar transistors of each voltage to current converter are connected to a different terminal of their respective resistive elements, wherein a current source is connected across each terminal of each resistive element of each voltage to current converter and ground.

3. A pseudo-four-quadrant analog multiplier according to claim 1 wherein the output stage comprises first and second transconductance stages and a current sum stage.

4. A pseudo-four-quadrant analog multiplier according to claim 3 wherein each transconductance stage comprises an emitter-coupled pair differential amplifier for receiving a different one of said first and said second voltages of said first and said second voltage generators, wherein the common emitter node of said first transconductance stage is coupled to the second transconductance stage and the common emitter node of said second transconductance stage is coupled to said current-sum stage.

5. A pseudo-four-quadrant analog multiplier according to claim 3 wherein the current-sum stage receives said third multiplier input and generates a current that is substantially proportional to said third multiplier input voltage, said current being equal to the sum of currents flowing in said first and said second transconductance stages.

6. A four quadrant analog multiplier according to claim 5 wherein said current-sum stage comprises a bipolar transistor for receiving the third multiplier voltage input at its base terminal, said bipolar transistor having an emitter terminal that is connected to a first terminal of a resistor and having a collector terminal that is connected to the common emitter terminal of said second emitter-coupled pair, wherein the second terminal of said resistor is connected to ground.

7. A pseudo-four-quadrant analog multiplier according to claim 1 wherein each of said first and second voltage generators further comprises first and second drive-boosters for respectively increasing the drive capability of an emitter terminal of its respective said first and second diode-connected bipolar transistors.

8. A pseudo-four-quadrant analog multiplier according to claim 7 wherein each said drive booster comprises an emitter-follower amplifier stage each comprising a bipolar transistor, wherein a collector terminal of each bipolar transistor of each emitter-follower amplifier is connected to a voltage supply, an emitter terminal of each bipolar transistor of each emitter-follower amplifier is connected to a first terminal of a current source and a base terminal of each bipolar transistor of each emitter follower amplifier is connected to a different one of the emitter terminals of said diode-connected bipolar transistors, wherein a second terminal of each current source is connected to ground.

9. A pseudo-four-quadrant analog multiplier according to claim 1 wherein a collector terminal of each diode-connected bipolar transistor is coupled to a collector terminal of a different one of bipolar transistors each having a base terminal and an emitter terminal that is coupled to ground.

10. A four quadrant analog multiplier according to claim 1 wherein the voltage level of each of said reference voltage, said first input voltage and said second input voltage is shifted using two-stage bipolar circuitry with each stage generating an output voltage that is one base-to-emitter voltage higher in potential than its input voltage.

11. A four quadrant analog multiplier according to claim 5 further comprising a capacitor for coupling said third multiplier input voltage to the input terminal of said current-sum stage.

12. A four quadrant analog multiplier according to claim 5 further comprising a resistor for increasing the impedance of the input terminal of said current-sum stage.

13. An integrated circuit comprising:

a first bipolar transistor having a base terminal for receiving a first voltage, an emitter terminal coupled to a first terminal of a resistor and to a first terminal of a first current source, and a collector terminal for generating a second voltage, wherein a second terminal of said first current source is coupled to a first voltage supply;

a second bipolar transistor having a base terminal for receiving a third voltage, an emitter terminal coupled to a second terminal of said resistor and to a first terminal of a second current source, and a collector terminal for generating a fourth voltage, wherein a second terminal of said second current source is coupled to the first voltage supply;

a third bipolar transistor having an emitter terminal coupled to the collector terminal of said first bipolar transistor and having base and collector terminals which are coupled to a first terminal of a second resistor whose second terminal is coupled to a second voltage supply;

a fourth bipolar transistor having an emitter terminal coupled to the collector terminal of said second bipolar transistor and having base and collector terminals which are coupled to a first terminal of a third resistor whose second terminal is coupled to the second voltage supply;

a fifth bipolar transistor having a base terminal coupled to the collector terminal of said first bipolar transistor, a collector terminal coupled to a third voltage supply and an emitter terminal coupled to a first terminal of a third current source, wherein a second terminal of said third current source is coupled to the first voltage supply;

a sixth bipolar transistor having a base terminal coupled to the collector terminal of said second bipolar transistor, a collector terminal coupled to the third voltage supply and an emitter terminal coupled to a first terminal of a fourth current source, wherein a second terminal of said fourth current source is coupled to the first voltage supply;

a seventh bipolar transistor having base and emitter terminals coupled to the first voltage supply and a collector terminal coupled to the collector terminal of said first bipolar transistor; and an eighth bipolar transistor having base and emitter terminals coupled to the first voltage supply and a collector terminal coupled to the collector terminal of said second bipolar transistor.

* * * * *